US010274932B2

(12) United States Patent
Ono et al.

(10) Patent No.: US 10,274,932 B2
(45) Date of Patent: Apr. 30, 2019

(54) MACHINING-INFORMATION MANAGEMENT DEVICE AND TOOL-PATH GENERATION DEVICE

(71) Applicant: MAKINO MILLING MACHINE CO., LTD., Tokyo (JP)

(72) Inventors: Kenichi Ono, Aiko-gun (JP); Hideki Heishi, Aiko-gun (JP); Toshimasa Uetama, Aiko-gun (JP); Rie Kawai, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 236 days.

(21) Appl. No.: 15/104,468

(22) PCT Filed: Dec. 27, 2013

(86) PCT No.: PCT/JP2013/085178
§ 371 (c)(1),
(2) Date: Jun. 14, 2016

(87) PCT Pub. No.: WO2015/097886
PCT Pub. Date: Jul. 2, 2015

(65) Prior Publication Data
US 2016/0320772 A1 Nov. 3, 2016

(51) Int. Cl.
*G05B 19/4093* (2006.01)
*G05B 19/4068* (2006.01)
*G05B 19/409* (2006.01)

(52) U.S. Cl.
CPC ..... *G05B 19/40938* (2013.01); *G05B 19/409* (2013.01); *G05B 19/4068* (2013.01);
(Continued)

(58) Field of Classification Search
CPC .............. G05B 19/4068; G05B 19/409; G05B 19/40938; G05B 2219/35167; G05B 2219/35528; Y02P 90/265
See application file for complete search history.

(56) References Cited

U.S. PATENT DOCUMENTS 5,973,466 A * 10/1999 Nogami ........... G05B 19/41865
318/569
6,341,245 B1 * 1/2002 Ueta .................... G05B 19/404
318/564
(Continued)

FOREIGN PATENT DOCUMENTS

CN 101489718 7/2009
JP 3-277448 12/1991
(Continued)

OTHER PUBLICATIONS

International Search Report dated Apr. 1, 2014, directed towards International Application No. PCT/JP2013/085178; 2 pages.

*Primary Examiner* — Abdelmoniem I Elamin
(74) *Attorney, Agent, or Firm* — Morrison & Foerster LLP

(57) ABSTRACT

A machining-information management device that manages machining information for a machine tool that machines a workpiece by moving said workpiece relative to a tool and/or moving said tool relative to the workpiece on the basis of a machining program. Said machining-information management device has the following: an extraction unit that extracts a tool swap command and a coordinate-system selection command from a machining program that machines a predetermined workpiece; an acquisition unit that acquires tool information associated with a tool specified in the aforementioned tool swap command and coordinate information associated with a coordinate system specified in the aforementioned coordinate-system selection (Continued)

command; and a generation unit that generates combined machining information that contains the abovementioned machining program, the aforementioned tool information, and the aforementioned coordinate information.

10 Claims, 10 Drawing Sheets

(52) U.S. Cl.
CPC .............. *G05B 2219/35167* (2013.01); *G05B 2219/35528* (2013.01); *Y02P 90/265* (2015.11)

(56) References Cited

U.S. PATENT DOCUMENTS

| | | | |
|---|---|---|---|
| 6,401,004 B1* | 6/2002 | Yamazaki | G05B 19/40937 318/568.1 |
| 6,512,961 B1* | 1/2003 | Fukaya | G05B 19/40937 700/174 |
| 9,229,444 B2* | 1/2016 | Baierl-Moehler | G05B 19/40938 |
| 2007/0093930 A1* | 4/2007 | Griggs | G05B 19/401 700/181 |
| 2008/0033592 A1 | 2/2008 | Okrongli et al. | |
| 2010/0204818 A1 | 8/2010 | Yamada et al. | |
| 2012/0095724 A1* | 4/2012 | Ando | B23Q 17/007 702/145 |
| 2013/0066447 A1* | 3/2013 | Baierl-Moehler | G05B 19/40938 700/86 |
| 2013/0282162 A1* | 10/2013 | Griggs | G05B 19/401 700/190 |

FOREIGN PATENT DOCUMENTS

| | | |
|---|---|---|
| JP | 7-7839 | 2/1995 |
| JP | 11-202917 | 7/1999 |
| JP | 2000-84794 | 3/2000 |
| JP | 2003-5811 | 1/2003 |
| JP | 2012-125889 | 7/2012 |

* cited by examiner

US 10,274,932 B2

MACHINING-INFORMATION MANAGEMENT DEVICE AND TOOL-PATH GENERATION DEVICE

CROSS-REFERENCE TO RELATED APPLICATION

This application is a U.S. National Stage patent application of International Patent Application No. PCT/JP2013/085178, filed Dec. 27, 2013, which is hereby incorporated by reference in the present disclosure in its entirety.

FIELD OF THE INVENTION

The present invention relates to a machining information management device for managing machining information of a machine tool and a tool path generating device provided with a machining information management device.

BACKGROUND OF THE INVENTION

Known in the prior art has been a machine tool making a tool move relative to a workpiece to cut and otherwise machine it. Further, known in the art is a numerical control type of such a machine tool which designates a path of a tool by coordinates of predetermined axes etc. and makes a tool move with respect to a workpiece to machine it. By making at least one of the workpiece and tool move in accordance with commands of a control device of the machine tool, it is possible to change the relative position of the tool with respect to the workpiece while automatically machining it.

Japanese Patent Publication No. 11-202917A discloses a method of managing machining data of a numerical control device able to manage all of the data required for machining all together by names of machining units and able to start machining by just designating a name of a machining unit and starting up.

CITATIONS LIST

Patent literature 1. Japanese Patent Publication No. 11-202917A

SUMMARY OF THE INVENTION

In a numerical control type of machine tool, machining is performed based on a machining program in which movement information for moving a relative position of a tool with respect to a workpiece is designated. A control device of a machine tool reads the machining program and drives a movement device of the machine tool based on the machining program. In this regard, in order for a machine tool to machine a workpiece, not only the machining program, but also other machining information for machining the workpiece become necessary. For example, the type of the tool, tool diameter, and other information of the tool when machining by a machine tool and information on the coordinate system used inside the machining program become necessary. Furthermore, as machining information, sometimes information separately set at the operation panel of the machine tool becomes necessary. Further, when machining, it is necessary to set information on the coolant etc. The user can set these various machining information for the desired machining of a workpiece.

In this regard, when machining a single type of workpiece, sometimes the same machining is again performed on a later date. When performing the same machining as past machining, it is possible to make the current machining information the same as the past machining information to perform machining similar to the machining performed in the past. In this regard, in the prior art, when machining a workpiece, the user had to store the above-mentioned various machining information after machining the workpiece. For this reason, when there was a possibility of performing the same machining later, the user judged if there was machining information which would be required later in the plurality of machining information used for machining. Further, the user had to collect and store the machining information required for the next machining.

However, there was the problem that skilled ability is required and time taken for collecting such various types of machining information. In particular, skilled ability is required for reading the machining program to collect the required tool information and collect the coordinate information. Further, to judge if machining information will be required while storing machining information, sometimes information forgets to be stored or other human error occurs. Further, even when reusing stored machining information, it is necessary to view and set the stored information. Skilled ability is required and time is taken. In this way, skilled ability and a high degree of care are required for reproducing the same machining as the machining performed in the past. As a result, the load of the user increases and the productivity of the machining of a workpiece ends up falling.

The present invention has as its object to provide a machining information management device of a machine tool and tool path generating device which can easily generate the machining information required for later machining.

The machining information management device of the present invention is a machining information management device for managing machining information of a machine tool using a machining program as the basis for making a tool and workpiece move relatively for machining, the machining information management device for managing machining information of a machine tool comprising an extracting part for extracting a tool change command contained in the machining program performing predetermined machining of a workpiece and a coordinate system selection command contained in the machining program, an acquiring part for acquiring tool information relating to a tool designated by the tool change command and coordinate information relating to a coordinate system designated by the coordinate system selection command, and a generating part for generating general machining information including the machining program, the tool information, and the coordinate information.

In the above invention, the device can further comprises a memory device for storing the general machining information.

In the above invention, the memory device may be a removable external memory device.

In the above invention, preferably the device further comprises a reading part for reading general machining information relating to past machining from the memory device and a display part for displaying general machining information, and the display part is formed to display tool information of current machining and tool information of past machining aligned with each other and to enable a current tool to be selected while referring to past tool information and further is formed to display the coordinate information of current machining and the coordinate information of past machining aligned with each other and to enable current coordinate information to be set while referring to past coordinate information.

In the above invention, preferably the machining program includes a main program and a secondary program cited in the main program, the extracting part extracts a tool change command and coordinate system selection command included in the main program and a tool change command and coordinate system selection command included in the secondary program, and the generating part generates general machining information including tool information and coordinate information based on the main program and the secondary program.

In the above invention, preferably the device further comprises a test information acquiring part for acquiring test information of the workpiece after machining of the workpiece, the acquiring part acquires test information of the workpiece from the test information acquiring part, and the generating part generates general machining information including the test information of the workpiece.

In the above invention, preferably the test information of the workpiece includes at least one of a test procedure of the workpiece and test results of the workpiece.

In the above invention, preferably the device further comprises an execution information acquiring part for acquiring information during a machining period at the time of machining of a workpiece, the acquiring part acquires information during the machining period from the execution information acquiring part, and the generating part generates general machining information including the information during the machining period.

In the above invention, the information during the machining period can include at least one of specifications of the machine tool, a machining condition designated by a operation panel of the machine tool, a macro variable included in the machining program, information on fasteners of the workpiece, and information of the coolant.

A tool path generating device of the present invention is a tool path generating device comprising a path generating part for generating a tool path based on shape data of a workpiece and a machining information management device for managing machining information of a machine tool, the machining information management device comprises an extracting part for extracting a tool change command included in a machining program for performing predetermined machining of a workpiece, an acquiring part for acquiring tool information designated by the tool change command, and a generating part for generating general machining information including the machining program and the tool information.

According to the present invention, it is possible to provide a machining information management device of a machine tool and tool path generating device which can easily generate the machining information required for later machining.

DETAILED DESCRIPTION OF THE INVENTION

Referring to FIG. 1 to FIG. 10, a machining information management device and tool path generating device in an embodiment will be explained. The machining information management device of the present embodiment manages general machining information of a machine tool.

Figure 1:
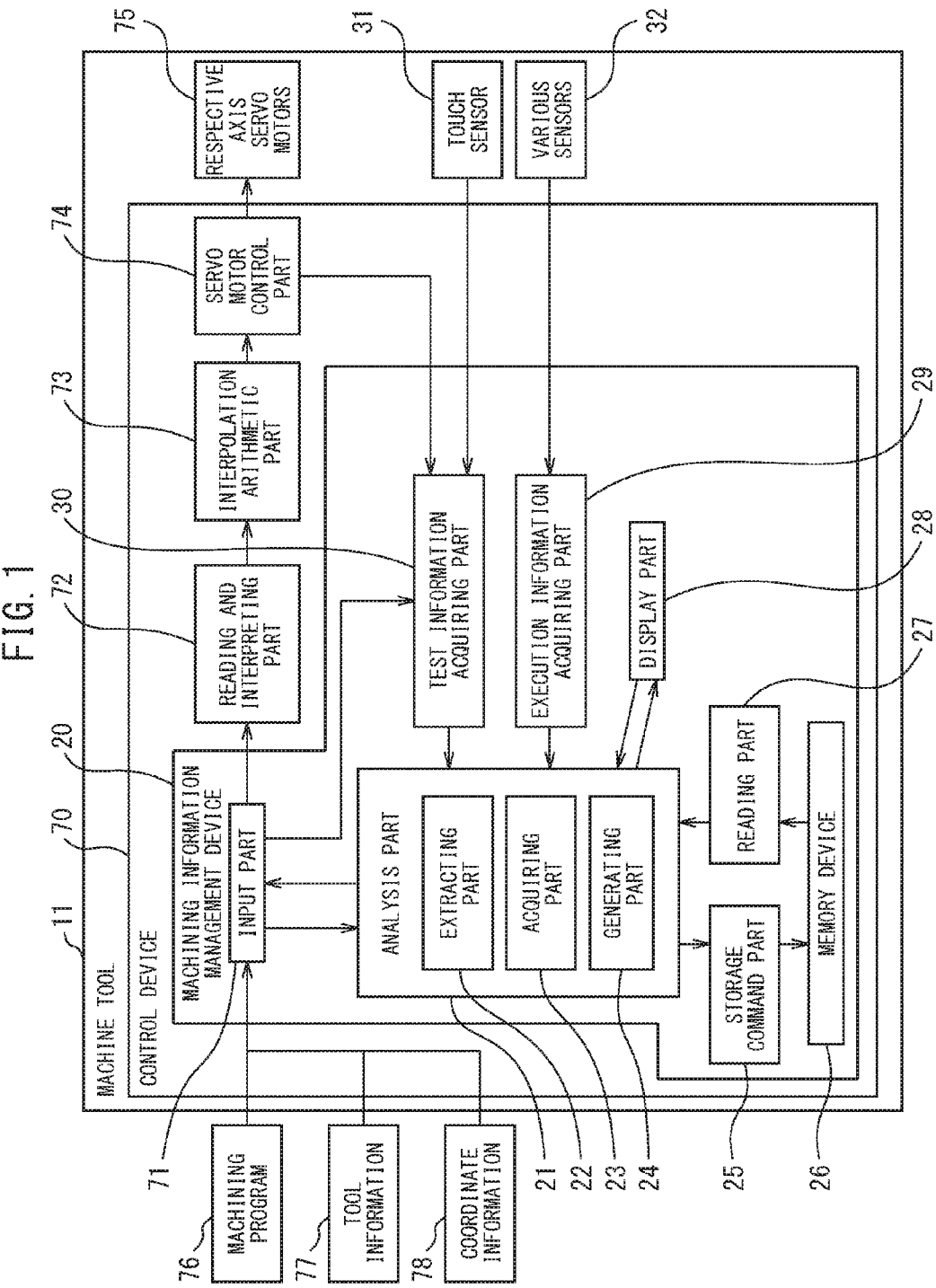
FIG. 1 is a block diagram of a machine tool in an embodiment.

FIG. 1 is a block diagram of a machine tool in an embodiment. A machine tool 11 is a numerical control type which uses a machining program 76 as the basis to make a tool and workpiece move relatively for machining. The machine tool 11 is comprised of a control device 70 for controlling a movement device or setting machining information. The control device 70 can be configured by components connected with each other through a bus such as a CPU (central processing unit), RAM (random access memory), ROM (read only memory), etc. As the machine tool, there are a machining center, milling machine, lathe, grinding machine, electrodischarge machine, or other various types of machines.

The control device 70 includes an input part 71, reading and interpreting part 72, interpolation arithmetic part 73, and servo motor control part 74. When using the machining program 76 as the basis to machine a workpiece, the user prepares the machining program 76. Alternatively, the machining program 76 can use a target shape of the workpiece as the basis to generate this by a CAM (computer aided manufacturing) system or other tool path generating device. The target shape of the workpiece can, for example, be prepared by a CAD (computer aided design) system. The machine tool 11 can read the machining program 77 and automatically perform machining of a workpiece.

The input part 71 receives as input the machining program 76 and other information. The input to the input part 71 may be performed by a user by manual input or may be performed by input of electronic information in which various types of information are contained. The machining program 76 includes information on the relative movement of a tool with respect to a workpiece. The input part 71 receives as input the tool information 77. The tool information 77 includes the type of the tool, diameter of the tool, length of the tool, and other information relating to the tool. The tool information 77 can be input by the user to the input part 71. Alternatively, the tool information 77 can be output from the CAM system.

The input part 71 receives as input the coordinate information 78. The coordinate information 78 is information of the coordinate system used inside the machining program 76. For example, when a plurality of workpiece coordinates are used in the machining program, the coordinate information 78 includes information of a plurality of workpiece coordinates. The coordinate information 78 can be input by the user in the input part 71 manually. Alternatively, the coordinate information 78 may be output from the CAM device.

The reading and interpreting part 72 reads the machining program 76 from the input part 71. The reading and interpreting part 72 sends out the movement command to the interpolation arithmetic part 73. The interpolation arithmetic part 73 calculates the position command value for each interpolation period. For example, the interpolation arithmetic part 73 calculates the amount of movement for each time interval set based on the movement command. The interpolation arithmetic part 73 sends the position command value to the servo motor control part 74. The servo motor control part 74 uses the position command as the basis to calculate the amounts of movement along the respective axis such as the X-axis, Y-axis, Z-axis, and other axis and drives the respective axis servo motors 75.

The control device 70 of the machine tool 11 of the present embodiment includes a machining information management device 20. The machining information management device 20 manages the plurality of information for machining by a machine tool. The machining information management device 20 can automatically generate general machining information combining the plurality of machining information. Further, the machining information management device 20 can call up past generated general machining information to set the machining information for the current machining of a workpiece.

Figure 2:
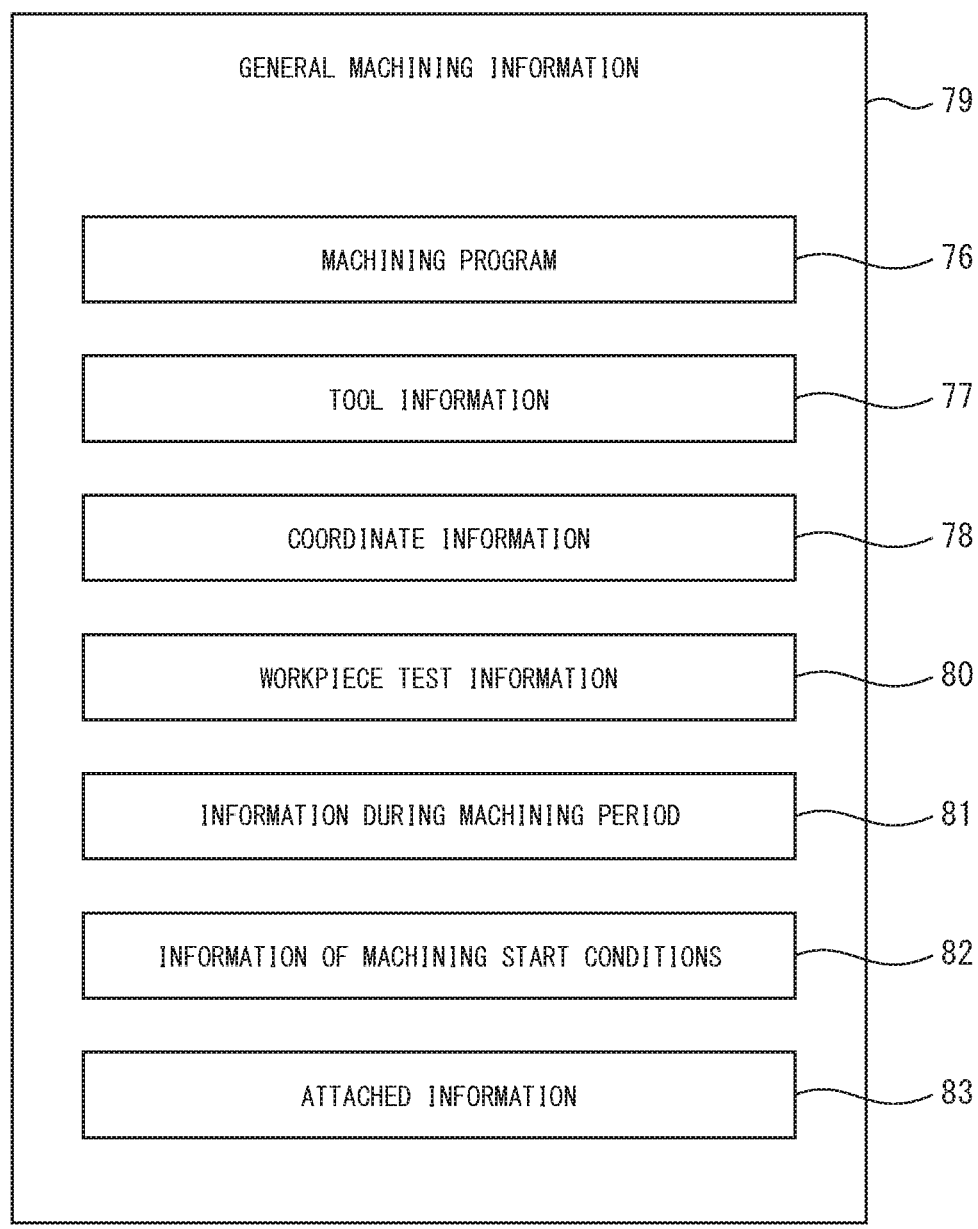
FIG. 2 is an explanatory view of general machining information in an embodiment.

FIG. 2 is an explanatory view of general machining information. The general machining information 79 includes the machining program 76, tool information 77, and coordinate information 78. These three machining information are information required for machining by the machine tool. The machining information management device 20 automatically records the three machining information in the general machining information 79. The machining program 76 is prepared in a format which the user can read and edit. The machining program 76 for example shows the commands to a machine tool in line units by a G-code, M-code, etc.

Further, the machining program 76 includes a main program. When the main program cites a secondary program, the machining program 76 includes the secondary program. When there are a plurality of secondary programs, the machining program 76 includes the main program and the plurality of secondary programs. Further, when the machining program 76 includes custom macro variables, the machining program 76 can include information on the custom macro variables.

The tool information 77 includes information relating to the tool for performing the machining. The tool information 77 includes information on the type of the tool such as a drill or endmill, the tool diameter, tool length, number of edges of the tool, and other information.

The coordinate information 78 includes information on the coordinate system used in the machining program 76. The coordinate systems of a machine tool include a machine coordinate system having a predetermined point of the machine tool as the origin. As opposed to this, for example, sometimes a workpiece coordinate system having any point on a workpiece as the origin is set. The workpiece coordinate system moves together with the workpiece when the workpiece moves. The workpiece coordinate system can be set by setting a relative position with respect to the machine coordinate system. Information of another coordinate system different from such a machine coordinate system is included in the coordinate information 78. Further, when a plurality of coordinate systems are used inside the machining program 76, the information of these plurality of coordinate systems is included in the coordinate information 78.

Further, the general machining information 79 can include workpiece test information 80 as information from testing the workpiece after machining. The workpiece test information 80 can include the test procedure and test results when running tests on a workpiece. The test procedure can include, for example, information on the measuring device used for the test, the type of the test such as a manual test or automatic test, and the measurement method. When performing automatic measurement, the measurement program can be included in the test procedure. The test results can include coordinate values or other detection values detected by the measurement device or information of the workpiece calculated from the detection values. Further, the test results can include the allowable values of the machining precision, information on the surface quality, etc.

For example, in a test performed after forming a circular depression in the planar shape of the workpiece, the test procedure can include information selecting manual or automatic testing and information of the touch probe as a measuring device. The test procedure can include information on the method of movement of a touch probe etc. Furthermore, the test procedure can include the position of the wall surface of the circular depression which the touch probe should be made to contact. The test results can include the coordinate values measured by the touch probe. Further, it is possible to use a plurality of coordinate values as the basis to calculate the inside diameter of the circular depression, the center position of the circle, and other various types of information. The test results can include various types of information of the workpiece calculated from the coordinate values measured in this way.

Further, the general machining information 79 can include information 81 during the machining period in which machining is actually performed. As the information 81 during the machining period, for example, the specifications of the machine tool, machining time, dimensions machined to, the load at the time of making the spindle of the machine tool rotate, the load applied to the movement device when making the tool move relative to the workpiece, etc. may be included. Further, the information 81 during the machining period may also include the temperature of a motor of the spindle or movement device, vibration of the motor, the state of wear of the tool, etc. Further, the information 81 during the machining period may include information relating to the fasteners for fastening a workpiece to a table or information relating to the coolant used.

Furthermore, the information 81 during the machining period can include parameters of the control device. For example, information 81 during the machining period can include information on the machining conditions designated by the operation panel of the control device. For example, override values relating to the speed of movement etc. can be set by the operation panel 41 of the control device 70. The information 81 during the machining period may include such override values.

Further, the general machining information 79 can include the information 82 of the machining start conditions and the attached information 83. The attached information 83 can include any information relating to machining. For example, it can include images of the machined products, design drawings of the workpieces, etc. Alternatively, the attached information 83 can include information such as the procedure for attachment of the workpiece.

Referring to FIG. 1, the machining information management device 20 of the present embodiment can automatically analyze the machining program 76, extract the tool to be used from the machining program 76, and acquire tool information 77 relating to the tool used. Further, it can automatically analyze the machining program 76, extract the coordinate system used in the machining program 76, and acquire the coordinate information 78 relating to the coordinate system used. Further, the machining information management device 20 can generate general machining information 79 including these machining program 76, tool information 77, and coordinate information 78 and store the general machining information 79. Further, the machining information management device 20 reads and displays the past generated general machining information 79 and assist the generation of the machining information for the current machining.

The machining information management device 20 includes the input part 71. The input part 71 has input to it the machining program 76, tool information 77, coordinate information 78, etc. Further, the input part 71 has input to it other machining information input by the operation panel etc.

The machining information management device 20 includes an analysis part 21. The analysis part 21 includes an extracting part 22, acquiring part 23, and generating part 24. The extracting part 22 extracts the tool change command, coordinate system selection command, and other commands included in the machining program 76. The machining program 76 is labeled by a capital letter. For example, when the tool change command is designated by "T", the extracting part 22 extracts the tool change command started at T from the machining program 76. Further, the coordinate system selection command, for example, is designated by a string of alphanumerics such as G54. The extracting part 22 extracts the coordinate system selection command designated by G54.

The acquiring part 23 acquires the tool information relating to the tool designated by the tool change command. Further, the acquiring part 23 acquires the coordinate information relating to the coordinate system designated by the coordinate system selection command. The generating part 24 uses these tool information 77 or coordinate information 78 as the basis to generate an electronic file of the tool information 77 and an electronic file of the coordinate information 78. Furthermore, the generating part 24 acquires the workpiece test information 80, information 81 during the machining period, information 82 of the machining start conditions, and attached information 83 to generate the electronic files of the respective machining information. Further, the generating part 24 generates general machining information including these machining information. In this way, the generating part 24 can generate general machining information for machining one workpiece.

Note that, when the machining program includes macro variables, the extracting part 22 extracts the macro variables and the acquiring part 23 acquires information relating to the macro variables. For example, the acquiring part 23 acquires information defining the macro variables. Further, the generating part 24 can include information relating to the macro variables in the general machining information.

The machining information management device 20 includes a storage command part 25 and a memory device 26. The storage command part 25 stores general machining information generated by the generating part 24 in the memory device 26. In the present embodiment, a folder of general machining information is generated and an electronic file of tool information, an electronic file of coordinate information, etc. are stored in the folder of general machining information. Note that, the generating part 24 of the present embodiment generates one electronic file for one set of machining information, but the invention is not limited to this. It is also possible to generate one electronic file of general machining information in which a plurality of sets of machining information are included. That is, the single electronic file of the general machining information may also contain a machining program, tool information, coordinate information, and other various types of machining information.

Note that, the memory device 26 of the present embodiment is arranged inside of the machining information management device 20, but the invention is not limited to this. The memory device 26 may also be arranged outside of the machining information management device 20. For example, a memory card or hard disk or other detachable external memory device may also be connected through a communication interface to the machining information management device 20.

The machining information management device 20 in the present embodiment includes a reading part 27 for reading past general machining information stored in the memory device 26. The past general machining information read from the reading part 27 is transmitted to the analysis part 21.

The machining information management device 20 includes the display part 28 for displaying the general machining information. The display part 28 can display machining information for the current machining. Further, the display part 28 can display the past generated machining information. For this reason, the user can check the past information while setting the current machining.

When testing a workpiece, the user inputs the information required for conducting the test to the input part 71. For example, the test procedure is input to the input part 71. The machining information management device 20 includes a test information acquiring part 30. The test information acquiring part 30 acquires information relating to the test results of the workpiece. The test information acquiring part 30, for example, receives a signal from a touch sensor 31. Further, the test information acquiring part 30 receives coordinate values of the machine coordinates from the servo motor control part 74. Further, the test information acquiring part 30 sends the information to the analysis part 21. The generating part 24 of the analysis part 21 uses the information of the test of the workpiece as the basis to calculate the test results of the workpiece. Further, the generating part 24 generates an electronic file of the workpiece test information 80 including the test procedure of the workpiece, the test results of the workpiece, etc. The workpiece test information 80 can be included in the general machining information 79.

Furthermore, the machining information management device 20 includes an execution information acquiring part 29 for acquiring information at the time of machining of a workpiece. The execution information acquiring part 29 receives signals from various types of sensors 32 and sends them to the analysis part 21. The various types of sensors 32 include a sensor attached to a spindle making a tool rotate, sensors attached to the movement devices of the different axes, a sensor attached to a coolant supply device, etc. The generating part 24 of the analysis part 21 uses the information from the execution information acquiring part 29 as the basis to generate an electronic file of information 81 during the machining period. Further, the generating part 24 can acquire the machining conditions set by the operation panel and information of the fasteners of the workpiece, and include it in the electronic file of the information 81 during the machining period. In this way, the information 81 during the machining period generated by the generating part 24 can be included in the general machining information 79.

Further, the generating part 24 can generate an electronic file of the information 82 of the machining starting conditions and the attached information 83 and include it in the general machining information 79. The machining information management device 20 can automatically generate general machining information 79 after machining a workpiece once. Alternatively, the user can instruct the preparation of general machining information by the operation panel so that the machining information management device 20 generates the general machining information 79.

Figure 3:
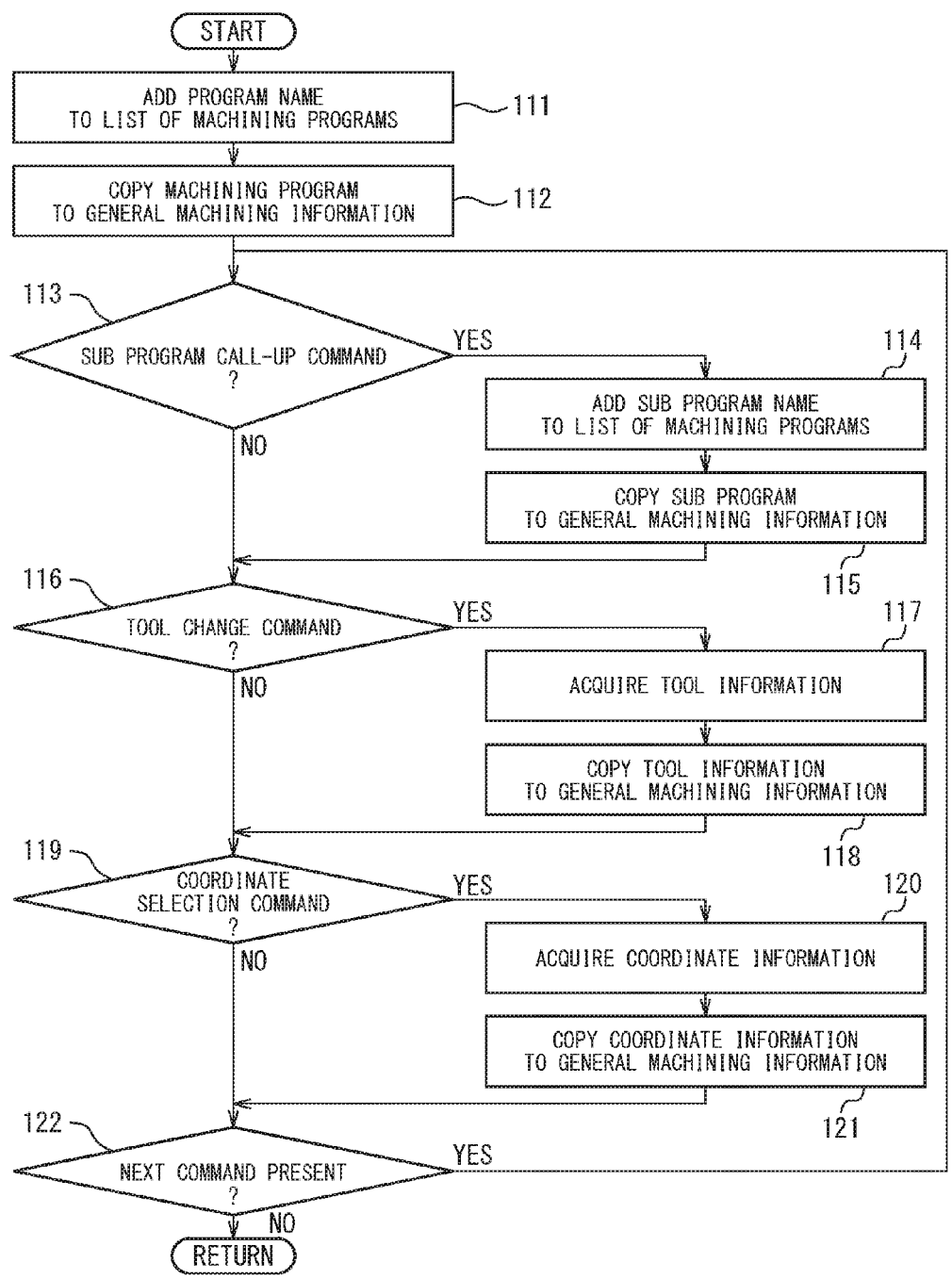
FIG. 3 is a flow chart of control for generating general machining information from a machining program.

FIG. 3 shows a flow chart of analysis control for analyzing a machining program. At step 111, the program name is added to the list of machining programs. In the present embodiment, a list of machining programs in which the names of the machining programs used are stored is generated. Right after starting the analysis control, the name of the main program in the machining program is added to the list of the machining programs.

Next, at step 112, the machining program is copied to the general machining information. For example, a folder of the general machining information is generated, then the electronic file of the machining program is copied to the folder of the general machining information.

Next, the inside of the machining program is analyzed. The inside of the machining program can be analyzed, for example, for every command described in one line. At step 113, it is judged if the current command is a command for calling up a secondary program. This control can be performed by the extracting part 22 of the analysis part 21. As the command for calling up a secondary program described in the machining program, "M98", "G65", etc. may be illustrated. When, at step 113, the current command is a read command of a secondary program, the routine proceeds to step 114.

At step 114, the name of the secondary program is added to the machining program list. Next, at step 115, the secondary program is copied to the folder of the general machining information. This control can be performed by the generating part 24 of the analysis part 21. When, at step 113, the current command is not a command for calling up a secondary program, the routine proceeds to step 116.

At step 116, it is judged if the current command is a tool change command. This control can be performed by the extracting part 22 of the analysis part 21. As the tool change command described in the machining program, "T9" or "M6" can be illustrated. When the current command is a tool change command, the routine proceeds to step 117.

At step 117, tool information relating to the tool designated by the tool change command is collected. This control can be performed by the acquiring part 23 of the analysis part 21. Next, at step 118, information of the tool of the current command is added to the file of the tool information. Further, the file of the tool information is copied to the folder of the general machining information. This control can be performed by the generating part 24 of the analysis part 21. When at step 116, the current command is not a tool change command, the routine proceeds to step 119.

Next, at step 119, it is judged if the current command includes a coordinate system selection command. This control can be performed by the extracting part 22 of the analysis part 21. As the coordinate system selection command described in the machining program, for example, commands beginning with "G" from "G54" to "G59" can be illustrated as selection commands of the workpiece coordinate system. When the current command includes a coordinate system selection command, the routine proceeds to step 120.

At step 120, coordinate information relating to the coordinate system contained in the current coordinate system selection command is collected. This control can be performed by the acquiring part 23 of the analysis part 21. Next, at step 121, the obtained file of the coordinate information is copied to the folder of the general machining information. This control can be performed by the generating part 24 of the analysis part 21. When, at step 119, the current command does not include a coordinate system selection command, the routine proceeds to step 122.

At step 122, it is judged if the machining program includes a next command. When the machining program has a next command, the routine returns to step 113 where the next command is analyzed. When at step 122 there is no next command, this control is ended.

By repeating the control from step 113 to step 122 for each command described in the machining program in this way, general machining information including the machining program, a secondary program included in the machining program, tool information relating to the tool, and coordinate information relating to the coordinate system can be generated.

Furthermore, when the main program includes a command for calling up a secondary program, control similar to the analysis control shown in FIG. 3 can be performed for the secondary program. Due to this control, tool information relating to the tool used in the secondary program and coordinate information relating to the coordinate system used inside a sub program can be included in the general machining information. The tool information relating to all of the tools used for machining of a workpiece and coordinate information relating to all of the coordinate systems can be included in the general machining information.

In this way, the machining information management device of the present embodiment can analyze the machining program and automatically generate general machining information including a machining program, tool information, and coordinate information. For this reason, information of the secondary program, tool information, and coordinate information contained in the machining program does not have to be judged and stored by the user. The machining information required for the next machining can be generated in a short time. In this case, there is no need for skilled ability. Furthermore, it is possible to keep the required information from being forgotten to be stored while generating general machining information. Furthermore, the machining information management device of the present embodiment can generate general machining information in a short time.

For example, the user does not have to view the machining program to specify the tool to be used or specify the coordinate system being used. Furthermore, there is no need for the work of collecting and storing tool information relating to the tool to be used and collecting and storing information relating to the coordinates used. It is possible to automatically store these machining information.

The machining information management device 20 of the present embodiment can read the past general machining information by the reading part 27 and display it at the display part 28. The user can refer to the past machining information while setting the current machining conditions. For this reason, when performing the same machining as in the past, it is possible to perform the setting of the machine tool in a short time. Further, even when performing machining similar to the past, it is possible to refer to the past machining information while currently setting the machine tool. For this reason, it is possible to avoid human error when setting the machining information in the machine tool while easily setting the machine tool. In this way, it is possible to lighten the load on a worker and shorten the time for setting a machine tool. As a result, it is possible to improve the production efficiency of a machine tool. Alternatively, it is possible to analyze the factors having an effect on machining quality from the past machining information and try to reduce the machining time or improve the machining quality.

By including the workpiece test information 80 in the general machining information 79, when testing the workpiece after machining, the user can refer to past test procedures and test results while reliably performing the test. Further, it is possible to refer to the past test procedures to easily perform a modification of the test procedure. Furthermore, it is possible to refer to the past test results to maintain or correct the settings of the machine tool in the current machining.

Further, by adding information 81 during the machining period to the general machining information 79, the user can refer to the past information during the machining period while setting the current machining conditions. When performing machining the same in the past or when performing machining similar to the past, it is possible to set the machine tool in a short time. Further, it is possible to predict the required time for the current repeated machining. Further, it is possible to reliably fasten the workpiece and set the coolant, etc. at the time of the current machining in a short time.

The machining information management device of the present embodiment can generate much information relating to machining of a workpiece all at once as a single set of general machining information. Further, when generating general machining information, the user does not have to collect the required information and can easily generate general machining information.

Note that, sometimes it is unclear if the tool information matches past tool information even if the tool is the same as the tool used in the past. For example, sometimes polishing of the tool etc. causes the tool diameter to change. For this reason, for the tool information, it is preferable to again measure the tool and input the results of measurement of the tool as the tool information of current machining. In this case as well, the tool information of the past general machining information can be utilized as the reference information. By referring to the past tool information, it is possible to reduce human error such as input error.

Further, regarding the coordinate information as well, sometimes it is unclear if it matches the past coordinate information. The workpiece is fastened by fasteners to the table etc. At this time, sometimes the position on the table where the workpiece is fastened shifts slightly. For example, sometimes the offset of the workpiece coordinate system with respect to the machine coordinate system changes. For this reason, regarding the coordinate information as well, it is preferable to again measure and set the information in the current machining. In this case as well, the coordinate information of the past general machining information can be utilized as reference information. By referring to the past coordinate information, it is possible to reduce human error such as input error.

Next, the machining information management device assembled in the control device of the machine tool of the present embodiment will be explained showing a more specific example.

Figure 4:
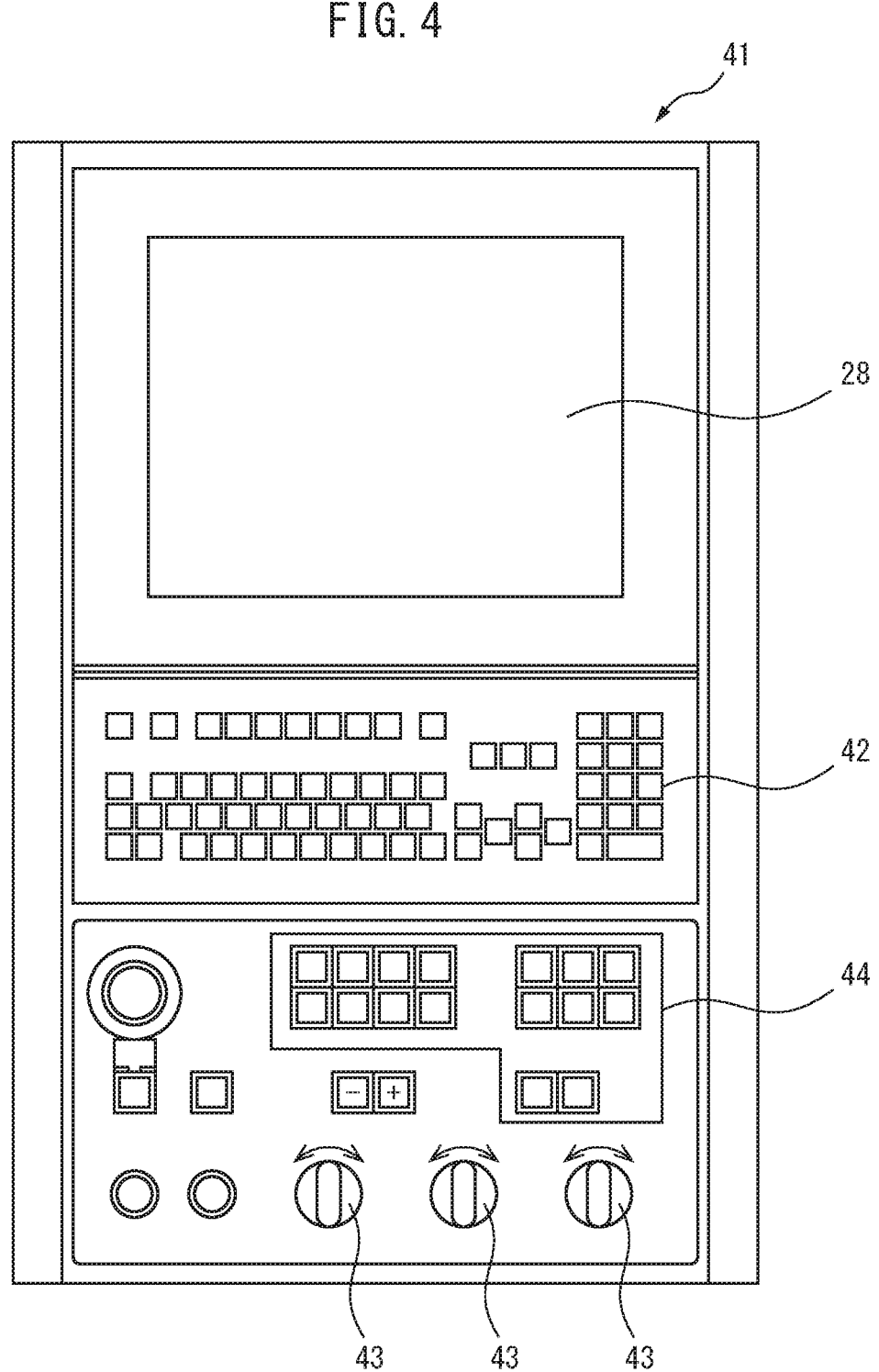
FIG. 4 is a schematic front view of an operation panel of a machine tool.

FIG. 4 shows a schematic front view of a operation panel arranged at the control device of the machine tool. The operation panel 41 includes a display part 28 for displaying various types of machining information and inputting machining information. The display part 28 of the present embodiment employs the touch panel system which enables a desired part of the screen to be selected by touch.

The operation panel 41 includes a key input part 42. The key input part 42 has a plurality of key switches arranged at it. By pressing the key switches at the key input part 42, it is possible to input predetermined numbers, letters, etc. Further, the operation panel 41 includes an operation switch part 44 for selecting a predetermined operation and an override setting part 43 for setting the override values. The override setting part 43, for example, can set an override value of the feed speed of the spindle, an override value of the feed speed of machining, etc. By setting the override values, it is possible to multiply the speed designated by the machining program by a set ratio to increase or slow the speed. The override values are included in the information 81 during the machining period of the general machining information 79.

Figure 5:
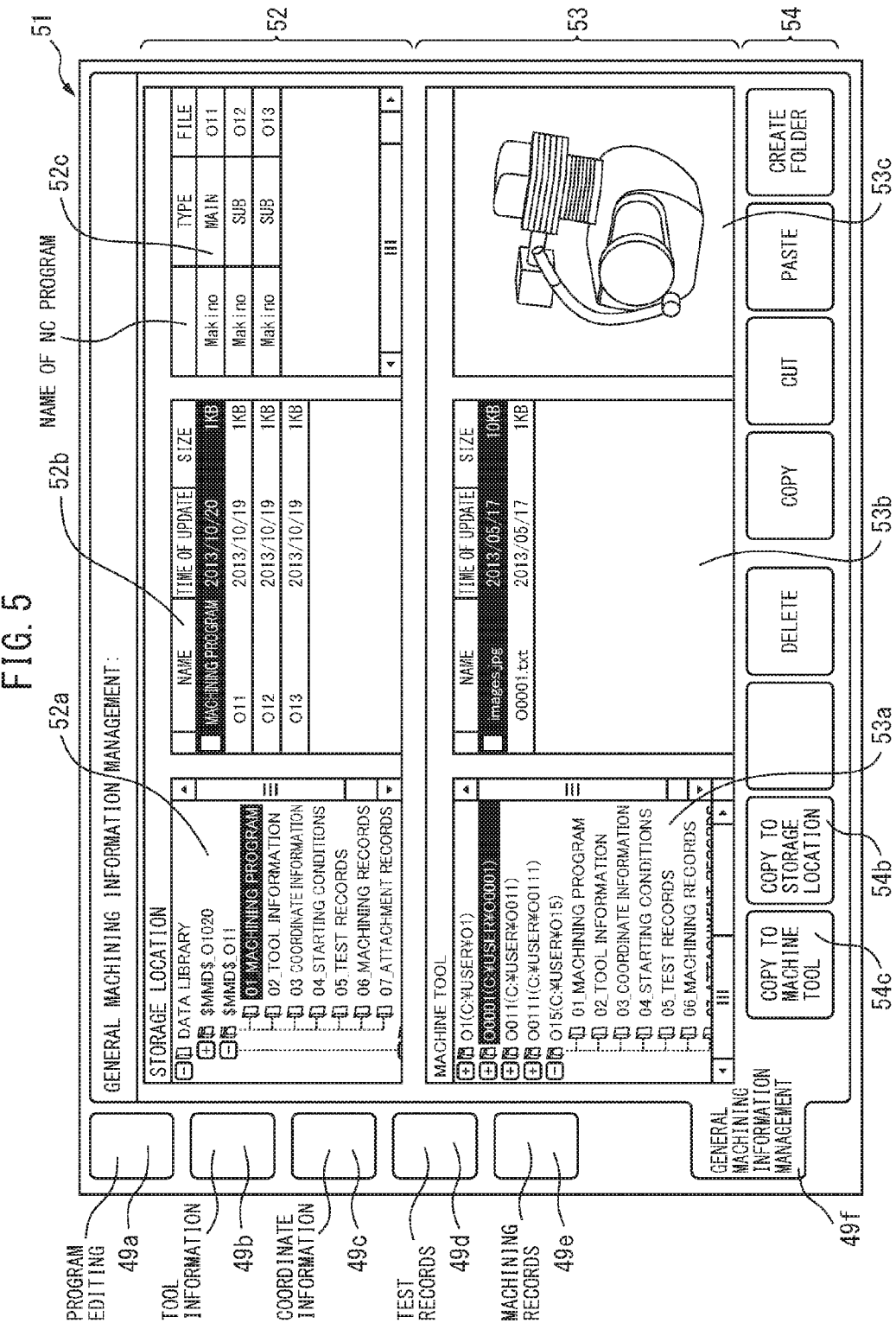
FIG. 5 is a schematic view for explaining a general machining information managing screen.

FIG. 5 to FIG. 8 show screens displayed at the display part 28 of the operation panel 41. FIG. 5 shows a general machining information managing screen. The general machining information managing screen 51 is displayed by selection of the general machining information management tab 49f. In the region at the bottom side of the screen, a button region 54 is arranged. At the button region 54, buttons are arranged for performing operations. At the general machining information managing screen 51, the general content of the general machining information can be checked. Further, at the general machining information managing screen 51, general machining information can be copied from the memory device to the storage region of the analysis part of the machine tool. Further, at the general machining information managing screen 51, general machining information generated at the storage region of the analysis part of the machine tool can be copied to the memory device.

The general machining information managing screen 51 includes a display region 52 showing the storage location of general machining information in the memory device and a display region 53 showing the storage region of content of the analysis part of the machine tool. A workpiece is machined by the machining information stored at the storage region at the inside of the analysis part of the machine tool being sent to the input part.

The display region 52 includes a display region 52a showing the storage location of general machining information in a hierarchical state. The display region 52 includes display regions 52b, 52c at which information selected at the display region 52a is displayed. In the example shown in FIG. 5, the machining program included in the O11 name general machining information stored at a storage location is selected. The display regions 52b, 52c show that the selected machining program includes the O12 name secondary program and O13 name secondary program.

The display region 53 of the general machining information managing screen 51 includes a display region 53a which shows the storage region of the analysis part of the machine tool in a hierarchal state. Further, the display region 53 includes display regions 53b, 53c for displaying the content selected at the display region 53a. In the example of FIG. 5, in the machine tool, the folder of the O0001 name general machining information is selected. In the display region 53b, the image file stored in the O0001 name folder is selected. Further, in the display region 53c, the image of a machined product stored in this image file is shown.

For example, when, as past general machining information, the storage location stores the O0001 name general machining information, the O0001 name general machining information is selected at the storage location. Next, by pushing the button 54c, it is possible to copy general machining information in the storage region of the machine tool from the stored location. In the following explanation, the case is illustrated where the O0001 name general machining information is selected at the display region 53 of the general machining information managing screen 51. First, the program editing tab 49a is selected.

Figure 6:
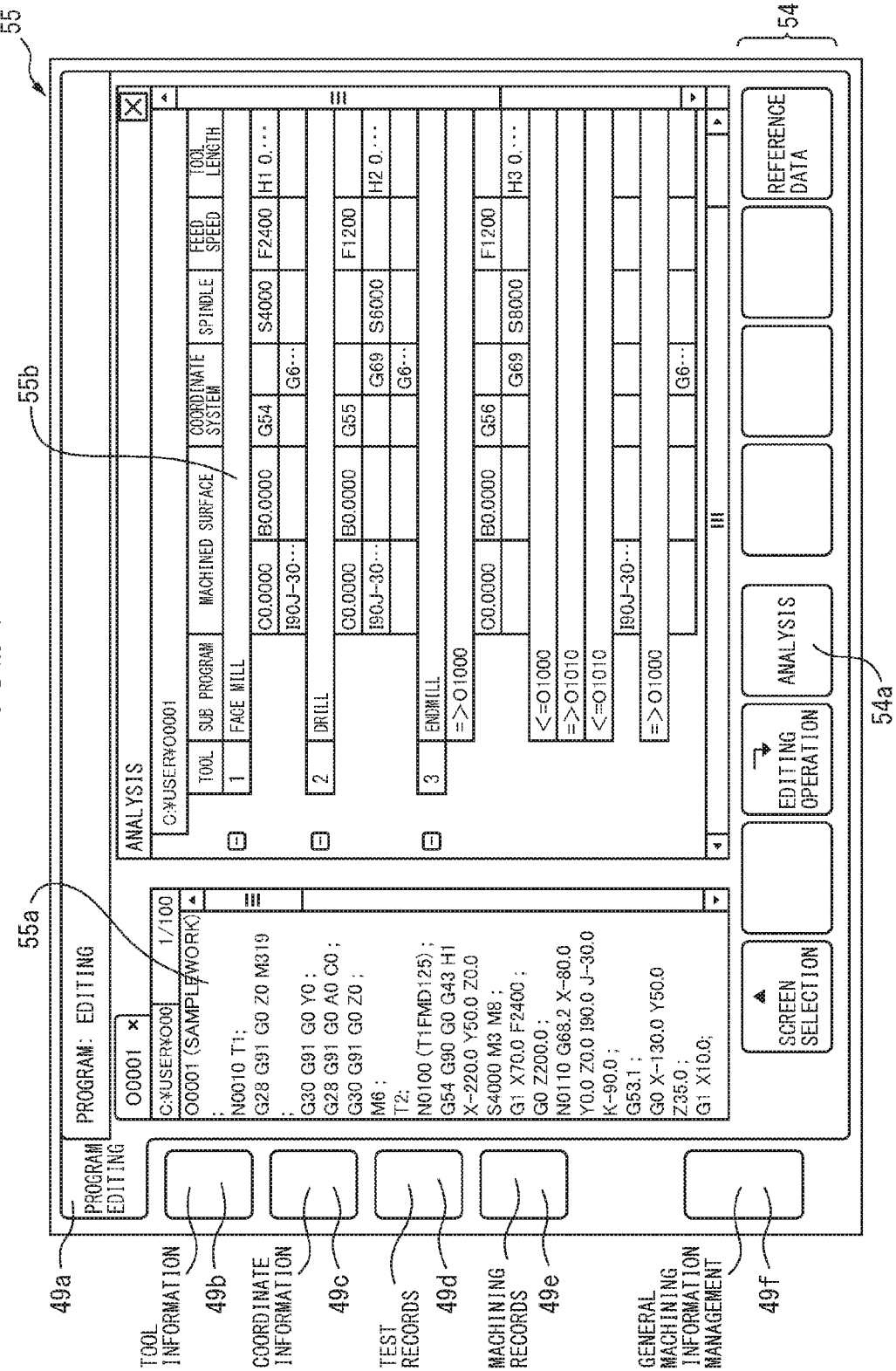
FIG. 6 is a schematic view for explaining a program editing screen.

FIG. 6 shows the program editing screen for displaying and editing a machining program. The program editing screen 55 includes a display region 55a at which the content of the machining program is displayed and the display region 55b at which a summary of the machining program is displayed. At the display region 55b, information on the machining surface and coordinate system is displayed for each tool used such as a face mill or drill.

Further, when the main program includes secondary programs, information of the secondary programs is displayed. In the example shown in FIG. 6, in machining using an endmill for the tool, a O1000 name secondary program is called up, then a O1010 name secondary program is called up. The user can check the display region 55b while confirming the machining program shown in the display region 55a. Alternatively, the user can easily edit the machining program.

Figure 7:
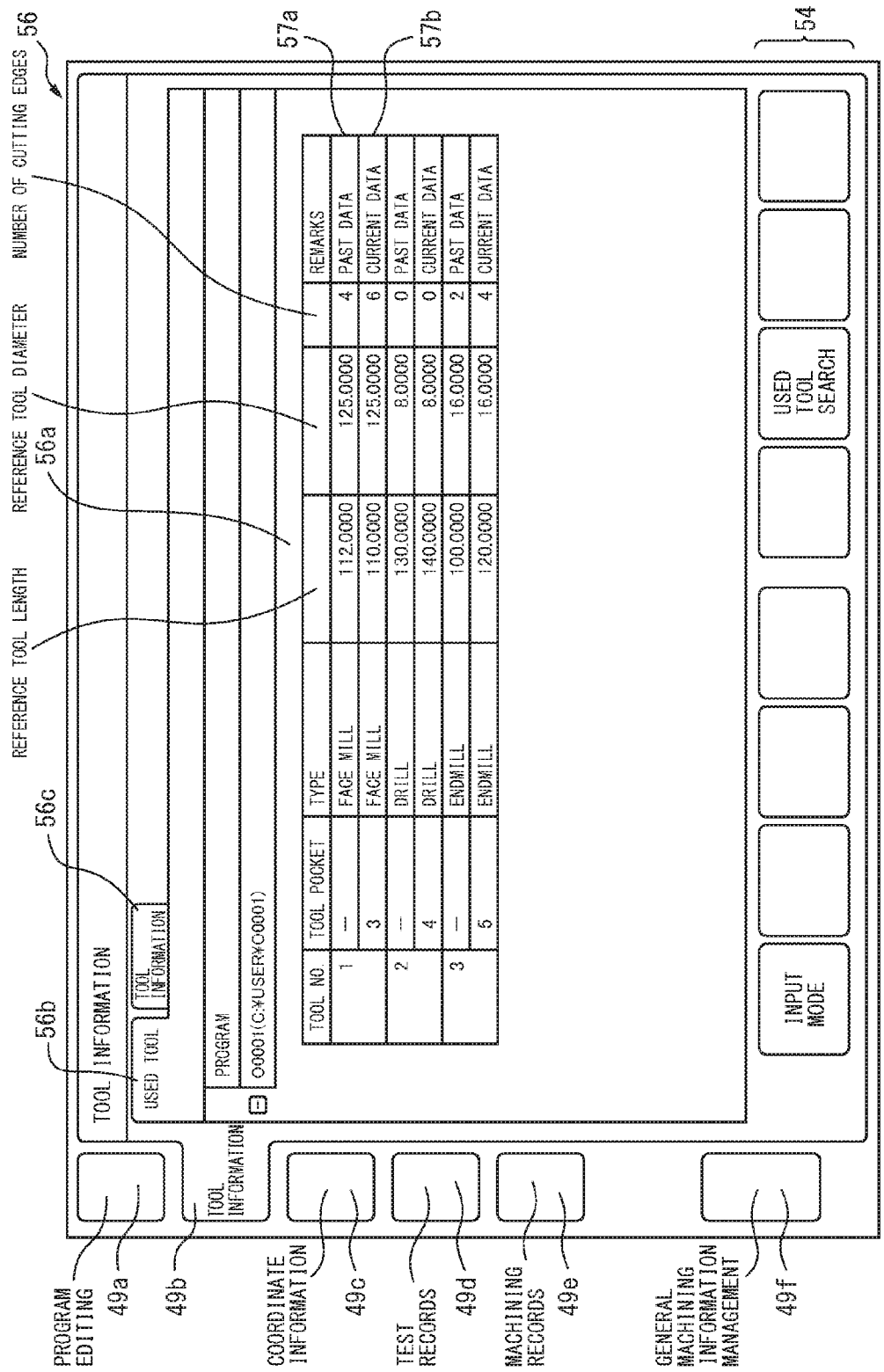
FIG. 7 is a schematic view for explaining a tool information screen.

Next, by selecting the tool information tab 49b, tool information can be displayed. FIG. 7 shows a tool information screen for displaying and editing tool information. The tool information screen 56 has a tab 56b for selecting a screen for displaying a tool used and a tab 56c for selecting a screen for displaying and editing information of the respective tools. In the example shown in FIG. 7, the tab 56b of the tool used is selected.

The display region 56a shows tool information of the tools used in the past and tool information of the current tools arranged in the tool magazine of the machine tool. The tool numbers are numbers of the tools used in the machining program. The tool pocket field shows the number of the tool pocket of the tool magazine of the machine tool. Here, for the tool of one tool number, a data display line 57a showing the tool information of the tools used in the past and a data display line 57b showing the tool information of the tools arranged in the current tool magazine are displayed. In this way, the tool information of machining performed in the past and the tool information of current machining are displayed aligned. Further, the device is formed that it is possible to refer to the past tool information while selecting the tool for the current machining. When the same or usable tool is placed in the tool magazine, it is possible to select the tool.

In the machining information management device of the present embodiment, when there is no tool the same as the tool used in the past in the tool magazine of the machine tool, a tool similar to the tool used in the past is searched for. If no usable tool is arranged in the tool magazine, the user places a usable tool in the tool magazine. Further, the tab 56c of the tool information screen 56 is selected to edit the tool information. After that, the tool used for the current machining is selected. By comparing the tool used for the current machining with tools used in past machining, it is possible to quickly select a tool. Further, it is possible to reduce the error in selection of tools.

Figure 8:
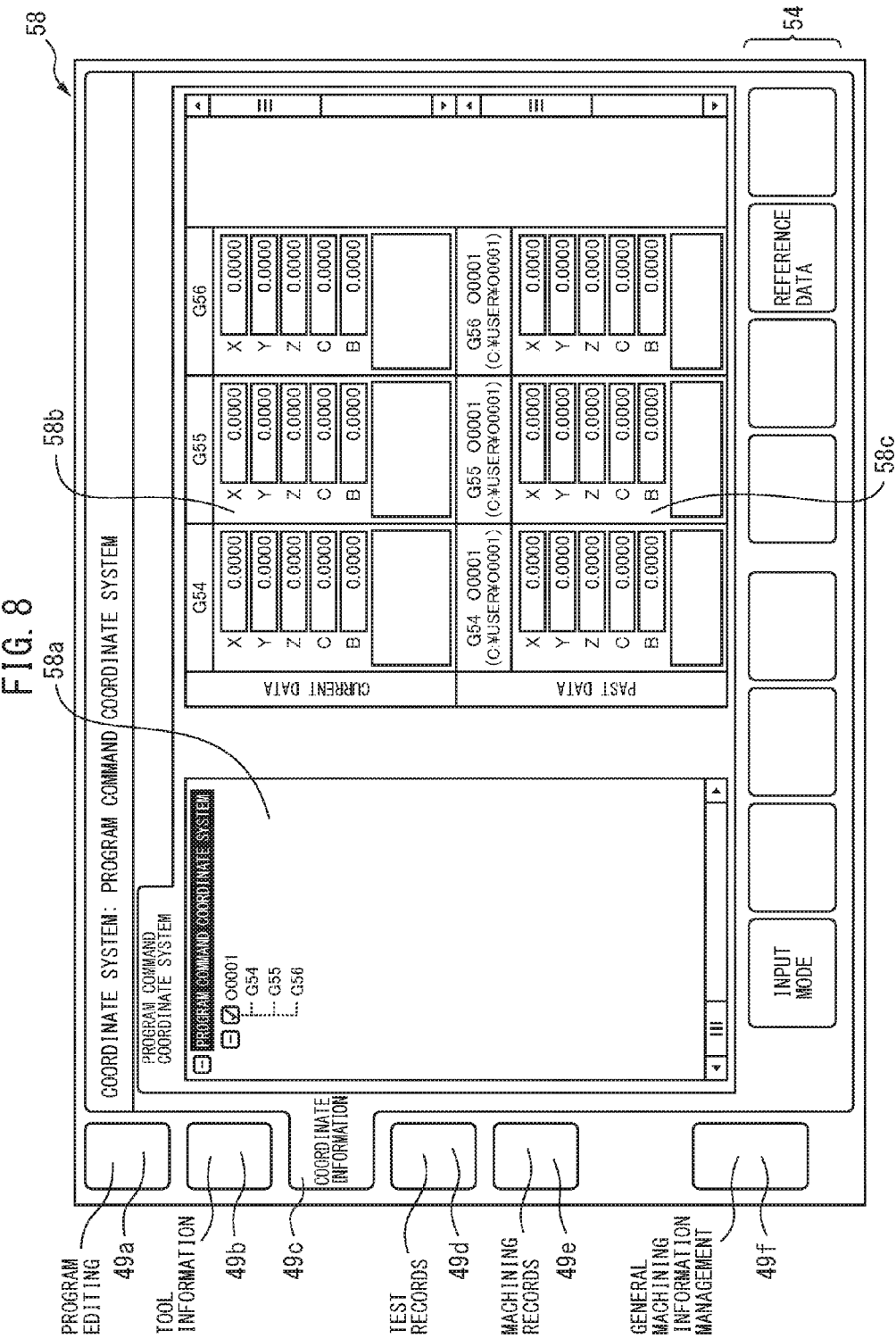
FIG. 8 is a schematic view for explaining a coordinate information screen.

Next, by selecting the coordinate information tab 49c, the coordinate information can be displayed. FIG. 8 shows a coordinate information screen for displaying and editing the coordinate information. The coordinate information screen 58 has a display region 58a displaying a list of coordinate systems used in a machining program. In this example, the O0001 name machining program uses the G54, G55, and G56 name coordinate systems. The display region 58b displays the coordinate information of the coordinate system for the current machining. The display region 58c displays the past coordinate information of the coordinate system. The coordinate information has input into it, for example, the difference in the workpiece coordinate system to the machine coordinate system when performing the current machining.

The coordinate information for the current machining set in the display region 58b is preferably set by placing the workpiece at the machine tool then measuring it. In this case, the machining information management device of the present embodiment displays the coordinate information of current machining and the coordinate information of past machining aligned. Further, it is also possible to refer to the past coordinate information while setting the coordinate information for the current machining. For this reason, it is possible to refer to the past coordinate information to easily confirm that the current coordinate information does not contain any error. For example, if the newly set coordinate information and the past coordinate information deviate by more than the attachment error of the workpiece, it is possible to become aware of the failure of attachment of the workpiece.

Next, by selecting the test record tab 49d, it is possible to display a test record screen. At the test record screen, it is possible to view the test records of workpieces relating to past machining. For this reason, it is possible to refer to the test records of past workpieces and use the past machining information as it is or edit the past machining information. Alternatively, at the test record screen, after the current machining is ended, the same or similar test procedure as a past test procedure can be used to test the workpiece. The past test procedure is stored, so a workpiece finished being machined can be easily tested. Further, it is possible to avoid errors in the test procedure etc. while running tests.

Further, by selecting the machining record tab 49e, past information during the machining period or past information on the machining start conditions can be viewed. It is possible to refer to the past information during the machining period or the past information of the machining start conditions to set the machining information for the current machining. For example, it is possible to refer to override values in past machining, workpiece test results, and working time to select the override values for the current machining. Alternatively, it is possible to refer to the information of the coolant when performing the previous machining and easily set the settings for current supply of coolant.

Referring to FIG. 6, by pushing the analysis button 54a arranged in the button region 54 after the machining information finishes being set, it is possible to prepare general machining information at the current machining and store it in the storage region of the machine tool. In this case, it is possible to overwrite the reference O001 name general machining information. Alternatively, it is possible to newly generate general machining information of a name different from the name O0001. Further, the machining information management device of the present embodiment can automatically generate general machining information together with the end of the machining of a workpiece.

The general machining information stored in the storage region of the machine tool can be copied to the memory device displayed at the storage location. For example, referring to FIG. 5, at the general machining information managing screen 51, by pushing the button 54b of the button region 54, it is possible to copy the general machining information generated at the machine tool to the storage location. For example, it is possible to store general machining information at a memory device at the outside of the machine tool until the next machining.

Note that, in the above explanation, the example was shown of generating general machining information for the current machining with reference to past general machining information, but the invention is not limited to this. It is also possible to generate general machining information when using a CAM system etc. to newly generate a machining program and newly set tool information, coordinate information, etc.

In this regard, the device for attaching a machining information management device of a machine tool is not limited to a machine tool. For example, the machining information management device of a machine tool of the present embodiment may also be attached to a CAM system or other tool path generating device.

Figure 9:
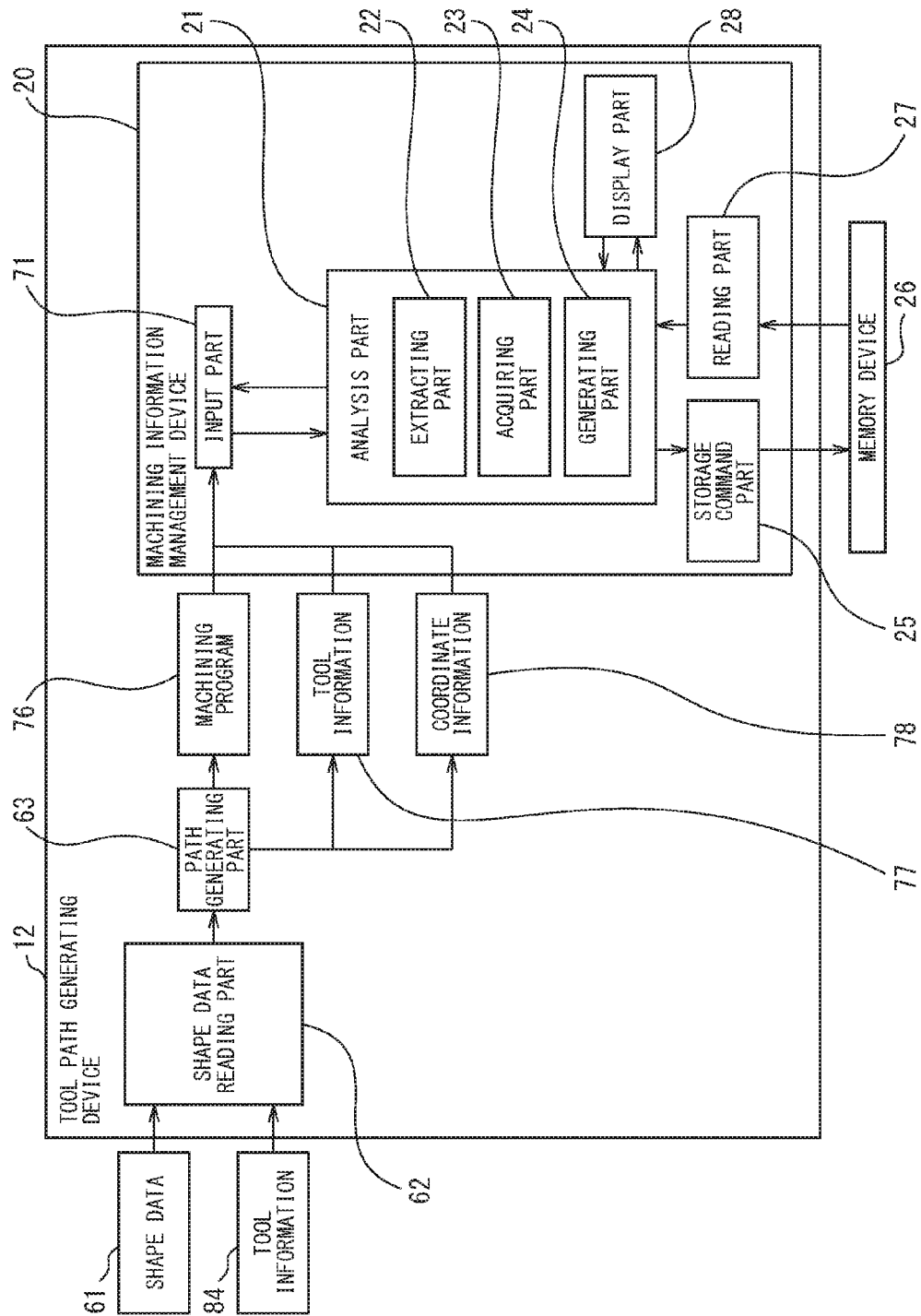
FIG. 9 is a block diagram of a tool path generating device in an embodiment.

FIG. 9 is a block diagram of a tool path generating device in the present embodiment. The tool path generating device 12 includes a shape data reading part 62 and a path generating part 63. The shape data 61 of a workpiece can be generated by a CAD system etc. The shape data reading part 62 reads the shape data 61 and tool information 84 and sends it to the path generating part 63. The path generating part 63 generates a path of relative movement of a tool with respect to a workpiece, that is, a tool path. The path generating part 63 outputs the machining program 76. Further, the path generating part 63 outputs tool information 77 and coordinate information 78.

The tool path generating device 12 of the present embodiment includes a machining information management device 20. The machining information management device 20 can use the machining program 76, tool information 77, and coordinate information 78 as the basis to generate or edit general machining information.

Note that, the tool information and the coordinate information are preferably input of accurate values in a machine tool actually performing machining. When using a plurality of coordinate systems, the coordinate information 78 includes information of relative positions with respect to the plurality of coordinate systems. Further, the path generating part 63 need not output the coordinate information 78. In this case, the machining information management device 20 generates general machining information including the machining program 76 and tool information 77.

Furthermore, the machining information management device of a machine tool of the present embodiment can be used at a location away from the machine tool and tool path generating device etc. The machining information management device can use a machining program generated by a CAM device etc. to prepare or edit general machining information, then transfer the general machining information to the machine tool.

Figure 10:
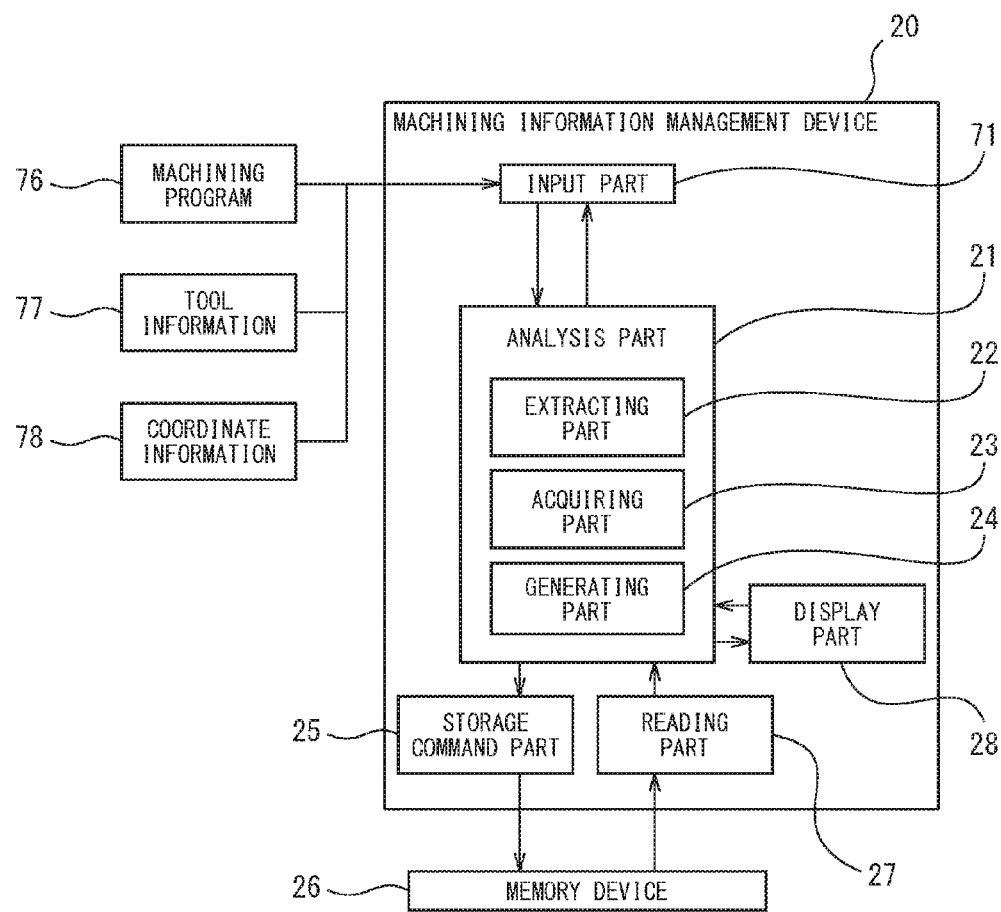
FIG. 10 is a block diagram of a machining information management device in an embodiment.

FIG. 10 is a block diagram of a machining information management device. FIG. 10 illustrates the state where the machining information management device 20 is not connected to a communication network etc. The machining program 76, tool information 77, coordinate information 78, and other various types of information are input through a memory card or other storage medium to the input part 71. The machining information management device 20 can prepare and edit the general machining information. Further, the prepared general machining information can be stored in the memory device 26. Further, the generated general machining information can be transferred to the machine tool and used at the machine tool. It is also possible prepare and edit general machining information at a separate location away from the machine tool so as to reduce the work at the machine tool and improve the operating rate of the machine tool.

A machining information management device arranged at a location away from such a machine tool and tool path generating device etc. may, for example, be connected to the machine tool or tool path generating device etc. through a communication network. For example, the machining information management device can be connected to a plurality of machine tools through a local area network in a factory. The general machining information generated and edited by the machining information management device can be sent through a communication network to the machine tool. Alternatively, the machining information management device may receive general machining information from a machine tool through a communication network.

The machining information management device of the present embodiment can be applied to not only machining information of a machine tool using an endmill or other tool for cutting operations, but also a lathe, grinding machine, electrodischarge machine, or any other machine tool.

In the above-mentioned control routines, the order of the steps can be suitably changed within a range where the functions and actions are not changed. The above embodiments may be suitably combined. In the above figures, the same or corresponding parts are assigned the same reference notations. Note that, the above embodiments are illustrative and do not limit the invention. Further, the embodiments include changes shown in the claims.

REFERENCE SIGNS LIST 11. machine tool
12. tool path generating device
20. machining information management device
21. analysis part
22. extracting part
23. acquiring part
24. generating part
25. storage command part
26. memory device
27. reading part
28. display part
29. execution information acquiring part
30. test information acquiring part
41. operation panel
43. override setting part
56. tool information screen
58. coordinate information screen
61. shape data
62. shape data reading part
63. path generating part
70. control device
76. machining program
77. tool information
78. coordinate information
79. general machining information 80. workpiece test information
81. information during machining period

The invention claimed is:

1. A machining information management device for managing machining information of a machine tool using a machining program as a basis for making a tool and a workpiece move relatively for machining, the device comprising a computer readable non-transitory medium storing therein instructions comprising:
   receiving the machining program, for performing predetermined machining of the workpiece, tool information and coordinate information;
   analyzing the machining program so as to judge for every command in the machining program whether or not it is a tool change command or a coordinate system selection command, and extracting the tool change command or the coordinate select command if it is a tool change command or a coordinate system selection command;
   acquiring from the received tool information, tool information relating to a tool designated by the tool change command, and acquiring, from the received coordinate information, coordinate information relating to a coordinate system designated by the coordinate system selection command; and
   generating general machining information including the machining program, the acquired tool information, and the acquired coordinate information.

2. The machining information management device according to claim 1, wherein the device further comprises a memory device for storing the general machining information.

3. The machining information management device according to claim 2, wherein the memory device is a removable external memory device.

4. The machining information management device according to claim 2, wherein the instructions further comprises reading the general machining information relating to past machining from the memory device and displaying the general machining information, wherein
   the tool information of current machining and the tool information of past machining is displayed aligned with each other and a current tool to be selected is enabled while referring to past tool information, and the coordinate information of current machining and the coordinate information of past machining is displayed aligned with each other and current coordinate information to be set is enabled while referring to past coordinate information.

5. The machining information management device according to claim 1, wherein
   the machining program includes a main program and a secondary program cited in the main program,
   the tool change command and the coordinate system selection command included in the main program are extracted, and the tool change command and the coordinate system selection command included in the secondary program are extracted, and
   the general machining information including the tool information and the coordinate information is generated based on the main program and the secondary program.

6. The machining information management device according to claim 1, wherein the instructions further comprises
   acquiring test information of the workpiece, and
   generating the general machining information including the test information of the workpiece.

7. The machining information management device according to claim 6, wherein the test information of the workpiece includes at least one of a test procedure of the workpiece and test results of the workpiece.

8. The machining information management device according to claim 1, wherein the instruction further comprises
   acquiring information during a machining period, and
   generating the general machining information including the information during the machining period.

9. The machining information management device according to claim 8, wherein the information during the machining period includes at least one of specifications of the machine tool, a machining condition designated by a operation panel of the machine tool, a macro variable included in the machining program, information on fasteners of the workpiece, and information of the coolant.

10. A tool path generating device for generating a tool path based on shape data of a workpiece and for managing machining information of a machine tool, the device comprising a computer readable non-transitory medium storing therein instructions comprising:
   receiving a machining program, for performing predetermined machining of the workpiece, tool information and coordinate information;
   analyzing the machining program so as to judge for every command in the machining program whether or not it is a tool change command, and extracting the tool change command if it is a tool change command;
   acquiring from the received tool information, tool information designated by the tool change command and
   generating the general machining information including the machining program and the acquired tool information.

* * * * *